United States Patent

[11] 3,594,977

| [72] | Inventor | Halvor Grasvoll |
| | | Goteborg, Sweden |
| [21] | Appl. No. | 19,410 |
| [22] | Filed | Mar. 13, 1970 |
| [45] | Patented | July 27, 1971 |
| [73] | Assignees | Gustav Gilbert Magnusson |
| | | Vastra Frolunda, ; |
| | | Karl Ingvar Weiner |
| | | Goteborg, Sweden, part interest to each |
| [32] | Priority | Mar. 27, 1969 |
| [33] | | Sweden |
| [31] | | 4300/69 |

[54] PACKING MACHINE
4 Claims, 6 Drawing Figs.

[52] U.S. Cl. .................................................. 53/162,
53/164, 53/245, 53/255, 214/6 DK, 214/6 H
[51] Int. Cl. ........................................................ B65b 5/10,
B65b 35/40
[50] Field of Search ............................................... 53/162,
164, 245, 255, 260; 214/6 DK, 6 H, 6 P

[56] References Cited
UNITED STATES PATENTS

| 814,454 | 3/1906 | Keyes ............................ | 53/164 X |
| 2,024,503 | 12/1935 | Bickford ....................... | 53/164 X |
| 3,203,560 | 8/1965 | Janzer ........................... | 214/6 H |

FOREIGN PATENTS

| 1,238,831 | 7/1960 | France ......................... | 53/162 |

*Primary Examiner*—Theron E. Condon
*Assistant Examiner*—Robert L. Spruill
*Attorney*—Kane, Dalsimer, Kane, Sullivan and Kurucz ABSTRACT: A packing machine for transferring articles such as milk cartons and similar objects from a conveyor via a conveyor plate laterally into a crate container or the like such that the cartons will be packed in the container in a uniform pattern, one layer of cartons on top of the other, without any gap forming between the adjacent cartons. The packages are fed onto the conveyor plate between a movable guide edge extending along the conveyor plate discharge edge and a guide edge mounted rigidly on the conveyor plate, and they are thereby prevented from spreading on the conveyor plate but will be positioned thereon closely adjacent each other.

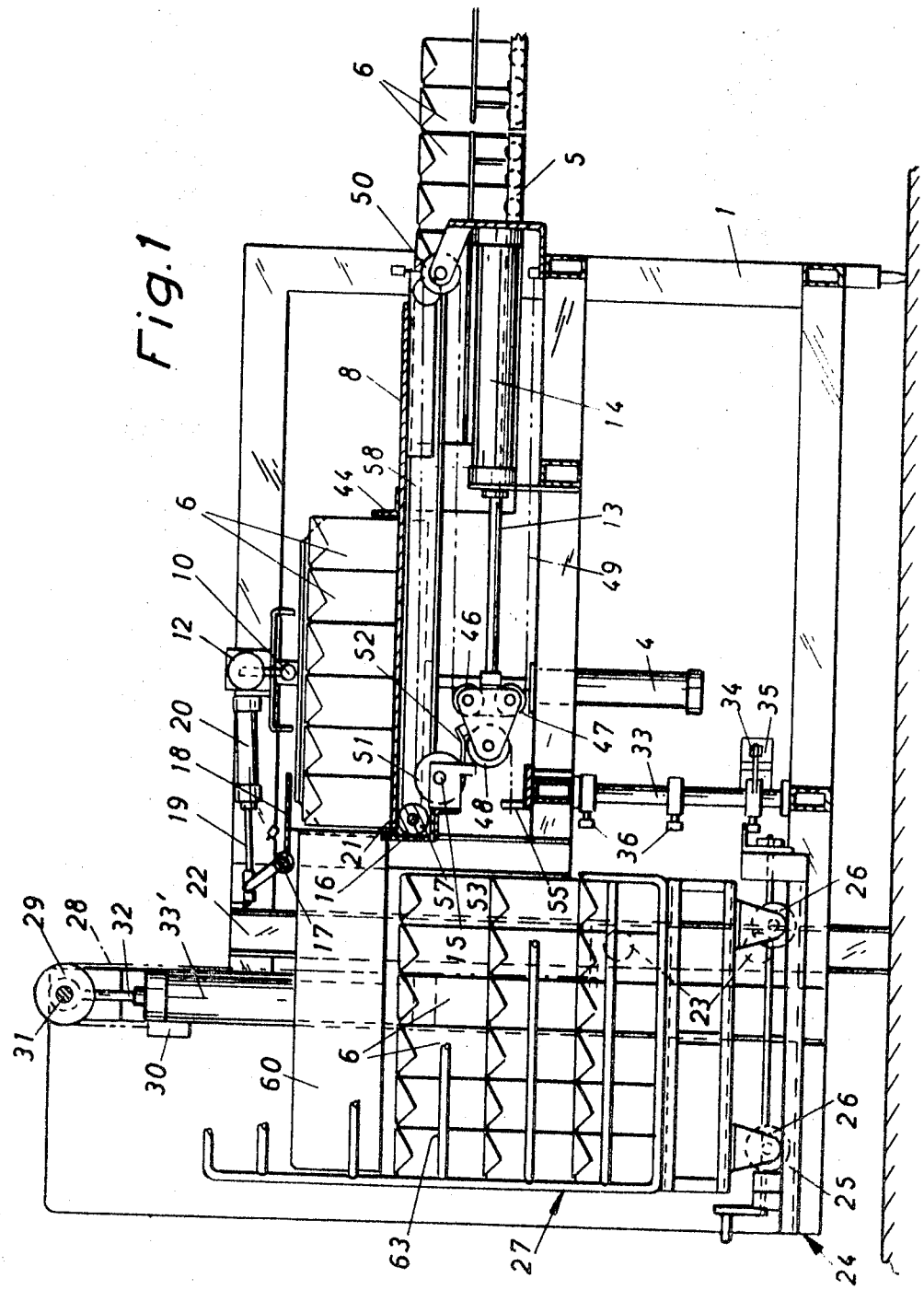

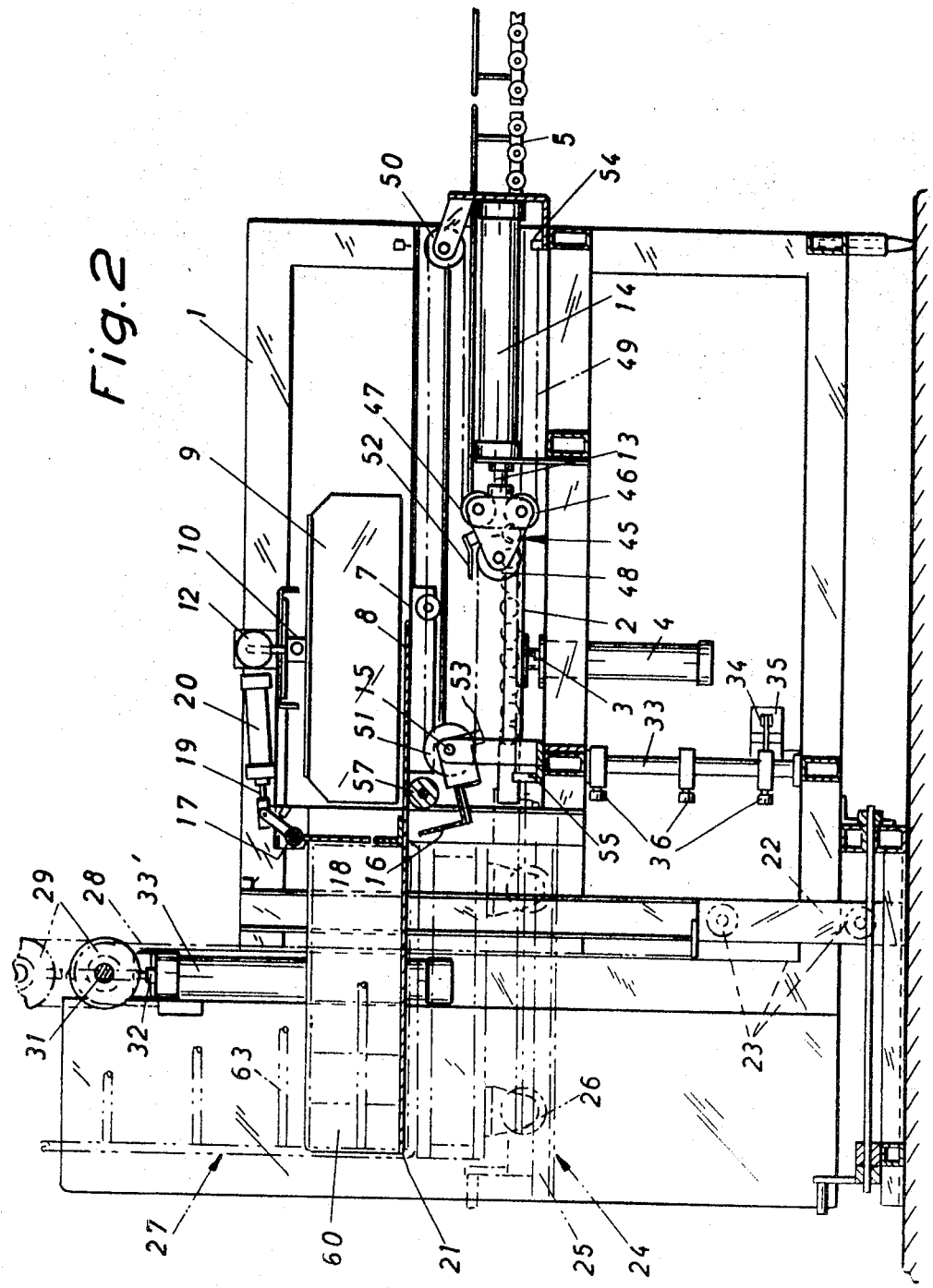

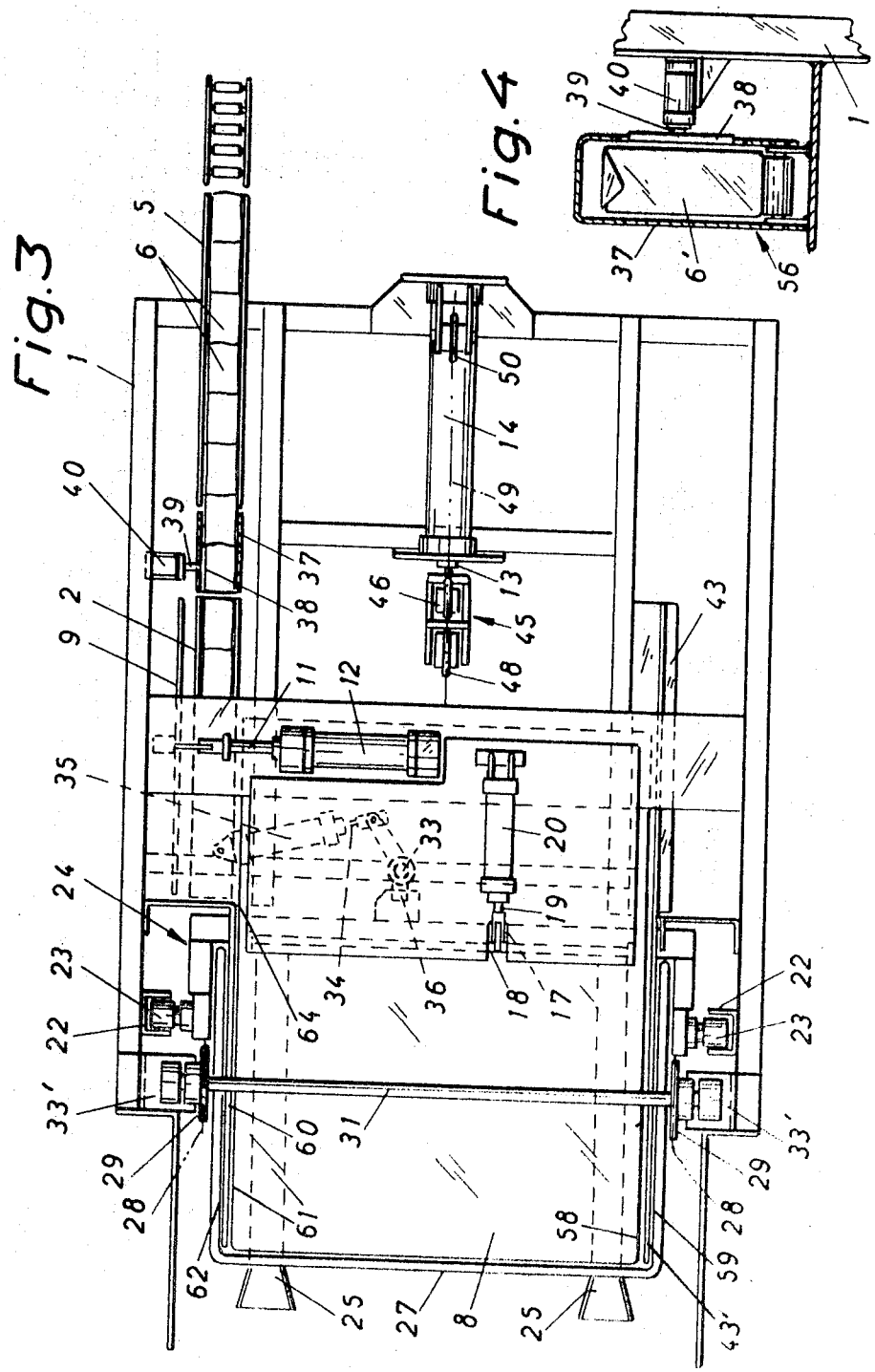

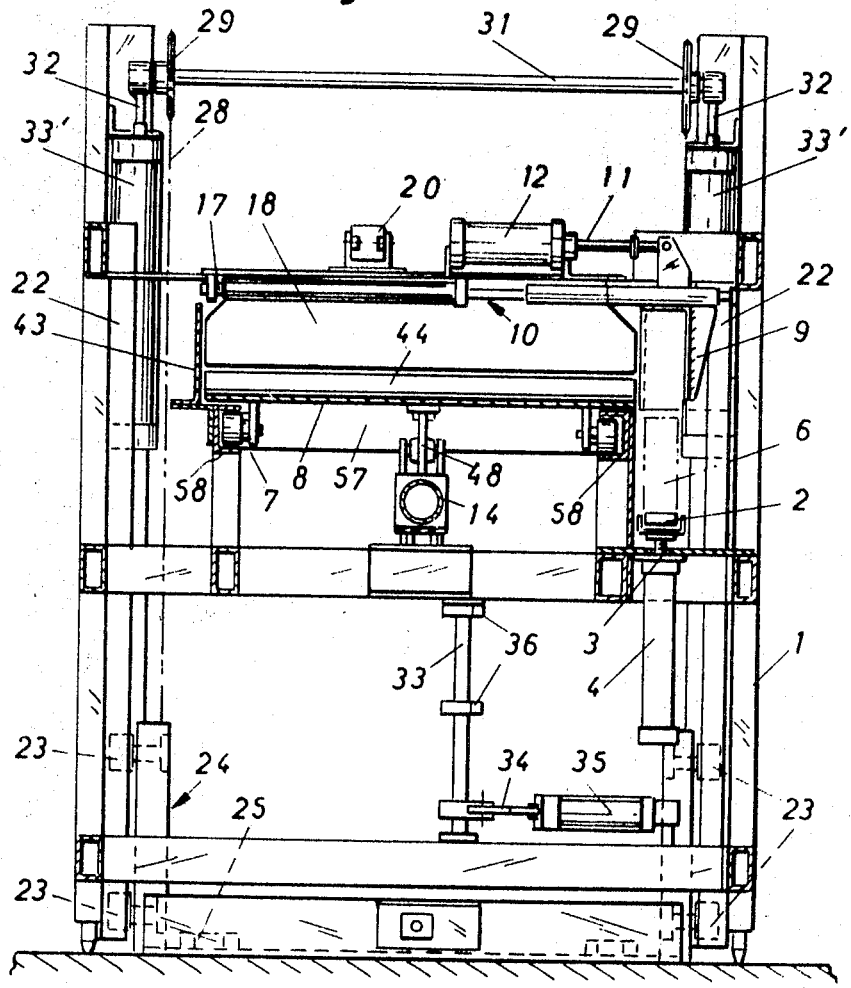
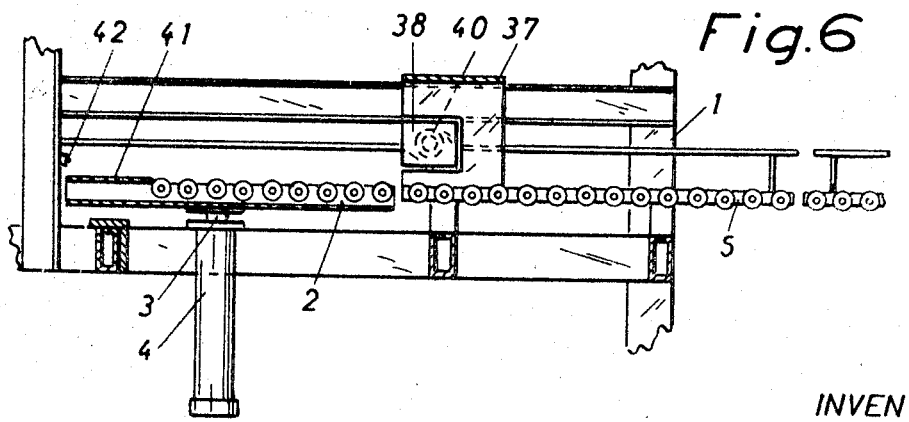

PACKING MACHINE

BACKGROUND OF THE INVENTION

In self-service stores use has lately been made of load pallets which are supported on runners and on which is mounted a container in the form of a rectangular cratelike box, at least one sidewall of which is removable. Such cratelike containers are known as "expotainers." They are filled with packing goods, such as milk cartons, by the manufacturer or wholesale dealer and delivered to the self-service stores where the customer provides himself with milk cartons from the expotainer.

The present invention relates to a packing machine by means of which it becomes possible to fill the containers of the kind referred to above with milk cartons or similar uniform packages or articles to be packed, by transferring them in layers, one on top of the other, from a conveyor, and such packing or filling of the containers can be carried out automatically or semiautomatically. The packing machine comprises a conveyor which is arranged at one side of the machine and adapted to forward milk cartons or other articles to be packed, a pusher means for feeding a row of packages from the conveyor laterally onto a conveyor plate on which a follower means is arranged and which plate is adapted to be moved substantially horizontally into the container, the conveyor plate and the container being arranged to assume different vertical positions relatively each other, and a means for stripping the packages off the conveyor plate when the latter returns to its original position.

When articles are transferred from a conveyor in rows laterally onto a conveyor plate by means of a pusher it has been found that the articles spread themselves in a fanlike pattern across the conveyor plate, i.e. the gap between adjacent articles in a row of articles which is first discharged onto the plate increases as this row of articles is being displaced further away from the conveyor and closer to the remote end of the conveyor plate. The result is that the articles place themselves on the conveyor plate in an undesirable pattern and it becomes difficult to transfer the articles to the crate container in such a way that they will be closely packed therein.

SUMMARY OF THE INVENTION

The purpose of the present invention is to remedy this deficiency and to this end the machine includes, in addition to the stripper means, a guide edge which extends along the edge of the conveyor plate facing the crate container i.e. the discharge edge, and being perpendicular to the conveyor, the said guide edge being arranged to be moved out of the path of movement of the conveyor plate when the latter is being displaced in over the crate container, and to be returned to its operative position, when the conveyor plate has assumed its original position in which it is again ready to receive the articles to be packed. Because the articles are transferred onto the conveyor plate by the pusher means between the "fixed" guide edge on the conveyor plate serving as a follower means and the movable guide edge when the latter is in its raised position in front of the discharge edge, the articles are prevented from spreading in a fanlike pattern in the direction towards a stop plate. The guide edge in accordance with the invention thus prevents the rows of articles, when the latter are being dispensed onto the conveyor plate, from spreading in an uncontrolled manner on this plate, and at the same time the risk of the packages falling from the plate is eliminated. The result is that the packages will be arranged close together in a uniform pattern on the conveyor plate.

BRIEF DESCRIPTION OF THE DRAWINGS

Further advantages and characteristics of the invention will appear from the following detailed description wherein FIG. 1 is a partly broken side view of the machine in accordance with the invention and shows the conveyor plate in FIG. 2 is likewise a partly broken side view of the same machine but showing the conveyor plate when displaced into the crate container, FIG. 3 is a plan view of the machine, FIG. 4 is a section through a part of the machine, showing a retainment means of the conveyor, FIG. 5 is a transverse section through the machine, and FIG. 6, finally, is a partial section of the machine showing mainly the conveyor.

DETAILED DESCRIPTION OF A PREFERRED EMBODIMENT

At one side of the machine frame 1 a roller conveyor 2 (see FIGS. 3 and 6) is arranged. A pneumatically operated piston and cylinder unit 3, 4 is adapted to displace the roller conveyor 2 from a lower position (shown in Fig. 2) in which the roller conveyor is at the same level as a supply conveyor 5 dispensing milk cartons 6, to a higher level in registry with a conveyor plate 8 which is adjusted to be displaced horizontally in the frame. The conveyor plate 8 rests both on a roller 57 which is fixed to the frame 1 and on a carriage 7 which is movable in a guide 58. Above the roller conveyor 2 a pusher means 9 is arranged for displacement in the transverse direction of the roller conveyor, the said pusher means being arranged in a horizontal guide 10 for reciprocal movement by means of a pneumatically operated piston and cylinder unit 11, 12. The horizontal displacement of the conveyor plate 8 is derived from a driver means consisting of a horizontal, pneumatically operated piston and cylinder unit 13, 14 and by means of a system of chains operated thereby.

An angular guide edge 16 is mounted so as to turn about a transverse shaft 15 beneath the conveyor plate 8 and it extends along the discharge edge 21 (the left edge in accordance with FIG. 1) of the conveyor plate 8 above the plane of the plate.

The conveyor plate 8 is operated in the following manner (See FIGS. 1 and 2). At the movable end of the piston cylinder unit 13, 14 is disposed a wheel assembly 45 comprising three triangularly arranged wheels 46, 47 and 48. At the rear end of the machine one end of a chain 49 is attached to a fixed point 54 in the frame, the said chain 49 extending forwards in the horizontal direction around the chain wheels 46, 47, then backwards in a horizontal direction whereafter it runs around a rear pulley 50 at the rear end of the frame 1 and further in a horizontal direction forwards and it is attached to the carriage 7 of the conveyor plate 8. From carriage 7 the chain 49 extends forwards, then runs around a forward pulley 51 (which is mounted on the same shaft 15 as the guide edge 16), extends horizontally backwards to the third chain wheel 48, runs around it and again extends forward to be finally secured in the forward part of the machine at a point 55 of the frame 1. Owing to this arrangement, power is transferred from the piston and cylinder unit 13, 14 for the displacement of the conveyor plate 8 in both directions, it being possible, on account of the step-up of the piston movement thus obtained, to use a piston cylinder having a relatively small stroke.

The wheel assembly 45 is further provided with a rib 52 which is adapted, when piston 13 assumes its outer end position (the left position in FIG. 1), to influence a corresponding rib 53 formed at the lower part of the guide edge 16 so as to tilt or swing the latter upwards. The guide edge 16 is thus swung upwards when the conveyor plate 8 is in its original position. When the wheel assembly 45 with the rib 52 moves to the right (see FIG. 2), i.e. when the conveyor plate 8 is displaced to the left, the guide edge 16 is swung away by its own weight.

Above the conveyor plate 8 is furthermore arranged a transverse shaft 17 about which a stripper plate 18 is pivotally mounted, the said stripper plate being operable by means of a pneumatically operated piston and cylinder unit 19, 20 (see FIGS. 1 and 2).

In front of the discharge edge 21 of the conveyor plate 8 the guides for the rollers 23 of an elevator carriage 24 having two horizontal support rails 25 fitting the runners 26 which are mounted on a so-called expotainer described above. The elevator carriage 24 is suspended in chains 28 or the like running over chain wheels 29 and attached at their opposite ends in the frame 1 at 30. The chain wheels 29 are mounted on a common shaft 31 (see FIG. 3) supported at its ends by the upper end of two pneumatically operated and vertically extending piston cylinder units 32, 33'. When the pistons 32 are displaced upwards at a certain speed, the elevator carriage 24 is lifted at twice that speed.

The machine also comprises a stopper means consisting of a vertical shaft 33 which is adapted to turn by means of a pneumatically operated and horizontally extending piston and cylinder unit 34, 35. Stoppers 36 are mounted on this shaft 33 to stop the elevator carriage 24 at different levels.

A short tunnel 37 (see FIGS. 4 and 6) is arranged at the terminal end of the supply conveyor 5. The articles 6 to be packed pass through this tunnel in which the instantaneously foremost carton 6' of the row of cartons is retained by a clamping plate 38 which is operable by means of a pneumatic piston and cylinder unit 39, 40.

The roller conveyor 2 adapted to be lowered and raised presents at its terminal end a horizontal braking plate 41 on which the packages first to arrive are stopped.

The machine further comprises electrical micro switches or similar impulse means to render the pneumatic piston cylinders operative or make them cease to be operative.

When an expotainer 27 has been moved onto the support rails 25 and the sidewall thereof facing the conveyor plate 8 has been removed, the elevator carriage 24 is displaced to its upper position, shown in FIG. 2. The packages 6, such as milk cartons, arriving on the supply conveyor 5, are continuously fed over onto the roller conveyor 2 which at this point assumes its lower position (see also FIG. 6). The first milk cartons 6 to arrive are then retarded on the braking plate 41 and are thereby packed closely together such that no gap will exist between them. On account of the pressure from the contents of the cartons the carton sidewalls are somewhat convex and for this reason there is always a certain gap at the upper end of such cartons when they are being handled in a conveyor. However, by the provision of the braking plate 41 the cartons 6 are packed closely together owing to the pressure exerted on them from the very feed pressure, it being hereby also ensured that a predetermined number of packages are fed over onto the roller conveyor 2 before the first package has reached an impulse means 42 on the frame 1 at the terminal end of the conveyor. The impulse means 42 starts the pneumatically operated piston and cylinder unit 3, 4 to raise the roller conveyor 2 up to the level of the conveyor plate 8. When for instance six milk cartons have been fed onto roller conveyor 2, but before the said conveyor is raised, a means, such as a counter, gives an impulse to the horizontal piston-cylinder unit 39, 40 to operate the clamping plate 38. The seventh milk carton 6' in the row is then retained in the tunnel 37 which ensures that the seventh carton will not be kept standing on the point of juncture between the supply conveyor and the roller conveyor 2 and by doing so be damaged when the latter is raised.

When the roller conveyor 2 arrives at the upper plane of the conveyor plate 8 and an impulse is given to the piston-cylinder unit 11, 12 whereby the pusher means 9 strips off the row of packages and transfers it to the conveyor plate 8. The pusher means 9 returns to its position of departure and the roller conveyor 2 is lowered, six new milk cartons 6 are then being transferred thereto owing to the release of the clamping plate 38, and so on. The cycle is repeated, until the conveyor plate 8 is filled with packages. As the rows of packages are being dispensed onto the conveyor plate 8 they thus push each other forwards on it until the first row of packages reaches a stop plate 43 fixedly arranged in the frame 1. This stop plate extends into the expotainer 27 as a side piece 43' of the conveyor plate 8. This side piece 43' is positioned between one side edge 58 of the transport plate 8 when the plate 8 is inserted in the expotainer 27, and one of the short walls 59 thereof. At the opposite side of the conveyor plate 8 a side piece 60 is in a corresponding way fixedly attached to the frame 1 between the opposite side 61 of the conveyor plate 8 and the opposite short wall 62 of the expotainer 27. By means of these side pieces 43' and 60 the layers of packages are kept well together in the expotainer during packing and it is also ensured that the milk cartons 6 are not caught by a cross bar 63 (see FIG. 1) when the expotainer 27 is raised or lowered. During filling of the conveyor plate 8 the stripper plate 18 is in its swung-up position. The guide edge 16 is likewise in raised position in abutment against the discharge edge 21 of the conveyor plate 8, and since the guide edge extends above the plane of the plate 8 it serves as a guide for the milk cartons 6. When the rows of packages are successively fed by the pusher means onto the conveyor plate, the rows of packages will not, as has hitherto been the case, spread in a fanlike manner and there is no risk for the packages to fall over the discharge edge 21 of the conveyor plate 8. This is prevented by the guide edge 16. At the opposite side is also attached a fixed guide edge 44 in the shape of an angle iron.

When the row of packages first discharged onto the conveyor plate 8 reaches the stop plate 43, i.e. when the conveyor plate 8 is completely filled, an impulse is given to the horizontal, pneumatically operated piston and cylinder unit 13, 14 which by means of a system of chains which is adapted to cause a movement corresponding to the double stroke of the piston cylinder unit 13, 14, displaces the conveyor plate 8 horizontally into the expotainer 27 while at the same time the guide edge 16 tilts by its own weight (see FIG. 2). The pusher means 9 remains in its inner end position at the side edge 61 of the conveyor plate 8 whereby the articles 6 to be packed are kept well pressed together between the pusher 9 and the stop plate 43 positioned opposite thereto and run no risk of being caught by the rear corner portion 64 of one of the side pieces 60 and being damaged. When the conveyor plate 8 reaches its outer end position, i.e. the position shown in FIG. 2, the stripper plate 18 is swung down to vertical position in line with the fixed guide edge 44. At the same time an impulse is given to the piston-cylinder unit 13, 14 to return the conveyor plate 8 to its original position, whereby the packages 6 are pushed off by the stripper plate 18 down from the conveyor plate 8. When the latter has reached its original position the guide edge 16 is raised by pressure from the rib 52 and filling of the conveyor plate 8 is again started. An impulse is hereby given to the horizontal piston-cylinder unit 34, 35 to swing away the upper stopper means 36 on the vertical shaft 33 while at the same time the elevator carriage 24 together with the expotainer 27 is lowered to the next stopper means 36 whereby the shaft 33 resumes its original position. The expotainer 27 has now been lowered a part distance corresponding to the height of one layer of packages 6. The procedure is repeated until the expotainer is completely filled with packages 6 with one layer of packages piled on top of the other in the expotainer 27.

It is thus possible to make the machine fully automatic but certain moments are preferably carried out manually depending for instance of the type of articles to be packed.

It is also possible to leave out the elevator carriage 24 and instead provide the machine with means for raising and lowering the conveyor plate 8, the pusher means 9 with the stripper plate 18 and their associated driving means, relatively the stand or platform onto which the crate container 27 or "expotainer" is moved for filling.

The embodiment as shown and described is to be regarded as an example only and it is possible to vary the different parts and details constructively in various ways within the scope of the appended claims. The machine may also be used for packing articles into cardboard boxes and the like which are placed on one side with the open side turned towards the forward edge of the conveyor plate 8, i.e. the feeding-out edge 21.

What I claim is:

1. An improved packing machine for packing articles, such as milk cartons or similar packages in a container, the machine comprising a conveyor which is arranged at one side of the machine and adapted to forward the milk cartons or other similar packages or articles to be packed, a pusher means, a conveyor plate onto which the pusher means feeds a row of packages laterally from the conveyor, a follower means provided on said conveyor plate, the said conveyor plate being adapted to be moved substantially horizontally into the container, the conveyor plate and the container being arranged to assume different vertical positions relatively each other, and a means for stripping the packages off the conveyor plate when the latter returns to its original position, the improvement comprising a guide edge extending along the edge of the conveyor plate facing the container and being perpendicularly to the conveyor, the said guide edge being arranged to be moved out of the path of movement of the conveyor plate, when the latter is being displaced in over the container, and to be returned to its original position, in which the plate is again ready to receive the articles to be packed.

2. A machine as claimed in claim 1, including a preferably pneumatically operated driving means to control the conveyor plate, wherein the guide edge being pivotable about a transverse shaft and adapted, while the conveyor plate assumes its original position, to be swung up against the discharge edge of the plate so as to extend above the plane of said conveyor plate, control means operable by said driving means and being arranged to control the movement of said guide edge.

3. A machine as claimed in claim 1, wherein vertically positioned side pieces extend in a horizontal direction forwards, into the container on either side of the conveyor plate above the conveyor plate plane, and inside the short sides of the container, and wherein the pusher means is adapted, when the conveyor plate is completely filled with packages, to be retained in its inner end position at the side edge of the conveyor plate, until the said conveyor plate with the packages thereon, has reached its position inside the container.

4. A machine as claimed in claim 3, wherein the side pieces consist of side plates which are fixedly attached in the machine frame, the side piece remote from the conveyor merging into a stop plate for the packages discharged onto the conveyor plate.